United States Patent [19]

Nojiri et al.

[11] 4,135,663
[45] Jan. 23, 1979

[54] SYSTEM FOR RECOGNIZING BAR CODE INFORMATION

[75] Inventors: Tadao Nojiri, Kariya; Akio Sugiura, Nagoya, both of Japan

[73] Assignee: Nippondenso Co., Ltd., Kariya, Japan

[21] Appl. No.: 828,593

[22] Filed: Aug. 29, 1977

[30] Foreign Application Priority Data

Sep. 10, 1976 [JP] Japan .............................. 51-109172

[51] Int. Cl.² ..................... G06K 7/10; G08C 9/06; G06K 19/06
[52] U.S. Cl. ............................... 235/463; 250/569; 235/487
[58] Field of Search ........................ 235/462, 463; 340/146.3 Z; 250/555, 566, 568, 569

[56] References Cited

U.S. PATENT DOCUMENTS

| | | | |
|---|---|---|---|
| 3,543,007 | 11/1970 | Brinker et al. | 235/462 |
| 3,673,389 | 6/1972 | Kapsambelis et al. | 235/436 |
| 3,743,819 | 7/1973 | Kapsambelis et al. | 235/435 |
| 3,838,251 | 9/1974 | Herrin | 235/462 |
| 3,868,634 | 2/1975 | Dolch | 235/462 |

*Primary Examiner*—Daryl W. Cook
*Attorney, Agent, or Firm*—Cushman, Darby & Cushman

[57] ABSTRACT

A system for recognizing bar code information having a plurality of bar codes. One of bar codes is constituted as an index code in a different manner from the other bar codes constituted as numerical codes. These bar codes are scanned sequentially and converted into corresponding parallel digital signals. Code scanning directions are discriminated with reference to the parallel digital signal corresponding to the index code. A plurality of registers adapted to memorize each parallel digital signal are triggered in forward and reverse sequences, when the scanning directions are discriminated to be forward and reverse, respectively.

4 Claims, 6 Drawing Figures

FIG.4

FORWARD →
← REVERSE (0) 0 0 0 0 0 1 1
(1) 0 0 0 0 1 1 0
(2) 0 0 0 1 0 0 1
(3) 1 1 0 0 0 0 0
(4) 0 0 1 0 0 1 0
(5) 1 0 0 0 0 1 0
(6) 0 1 0 0 0 0 1
(7) 0 1 0 0 1 0 0
(8) 0 1 1 0 0 0 0
(9) 1 0 0 1 0 0 0
(@) 0 0 1 1 0 1 0
(*) 0 0 0 1 0 1 1

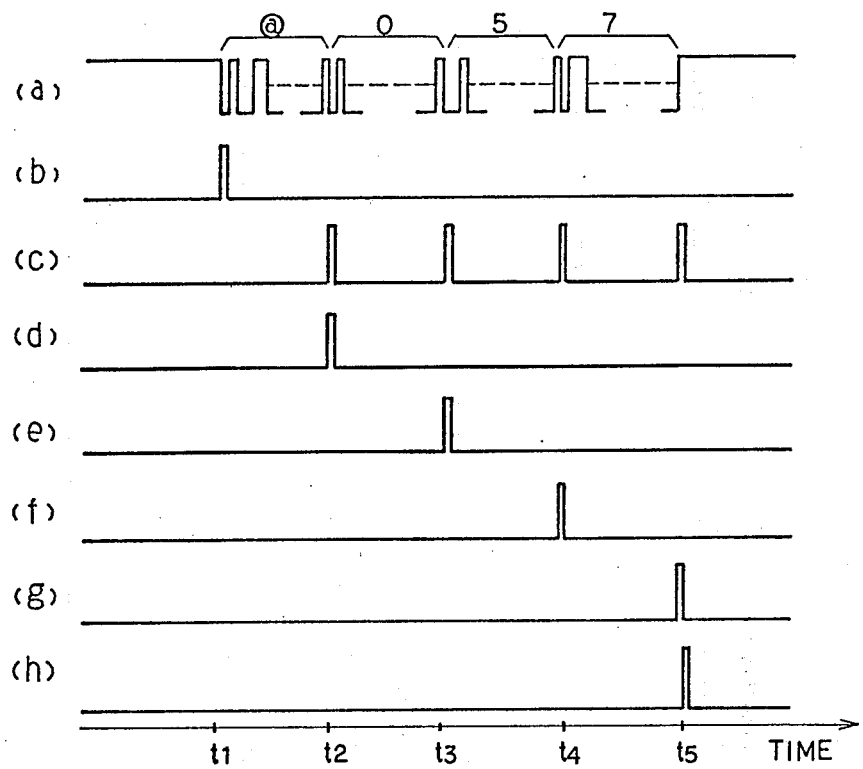
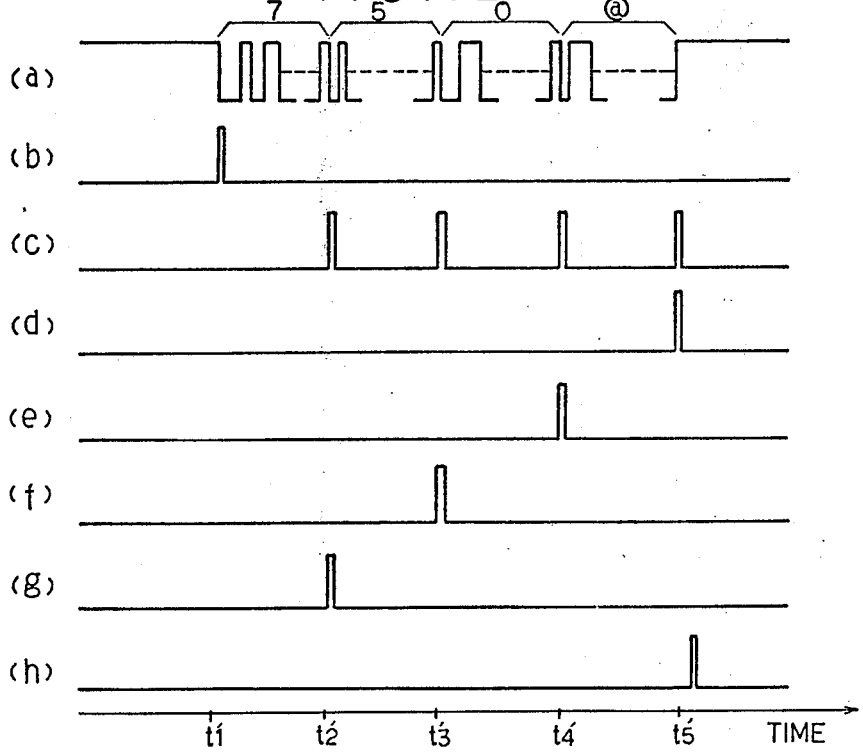

SYSTEM FOR RECOGNIZING BAR CODE INFORMATION

CROSS-REFERENCE TO A RELATED APPLICATION

This application is related to a U.S. Pat. application Ser. No. 668,036 which is entitled "METHOD AND APPARATUS TO READ IN BAR-CODED INFORMATION," filed on March 18, 1976 in the name of Tadao Nojiri et al. and assigned to the same assignee as this application.

BACKGROUND OF THE INVENTION

This invention is related to a system for recognizing bar code information and more particularly to a system in which an index code is provided and code scanning directions are discriminated with reference to the index code.

Disclosed in the prior application cited as a cross-reference is an information recognition system in which information is coded into a plurality of bar codes. These bar codes are constituted by a plurality of bar symbols according to a predetermined bar arranging method such as "2 OUT OF 7 COMBINATIONS." In addition to the bar codes carrying the information to be recognized, an index code constituted in a different manner is added at the head of plural bar codes to represent the beginning of coded information.

SUMMARY OF THE INVENTION

It is a primary object of this invention to provide a system, wherein code scanning directions are discriminated in accordance with a code signal corresponding to the index bar code and the sequence of code signals corresponding to respective bar codes are reversed when the scanning direction is discriminated to be reverse.

It is a further object of this invention to provide a system, wherein a plurality of buffer registers are provided to memorize the code signals sequentially produced in response to the code scanning and the buffer registers are triggered in the reverse sequence when the scanning direction is discriminated to be reverse.

DESCRIPTION OF THE DRAWINGS

In the accompanying drawings:

FIG. 4 is a chart illustrating detail arrangements of bar codes and corresponding code signals applied to the CPU 60 shown in FIG. 3; and FIGS. 5A and 5B are time charts illustrating signal waveforms (a) through (h) with regard to respective forward and reverse scannings for use in explaining the operation of the CPU 60 shown in FIG. 3.

DESCRIPTION OF THE PREFERRED EMBODIMENT

Figure 1:
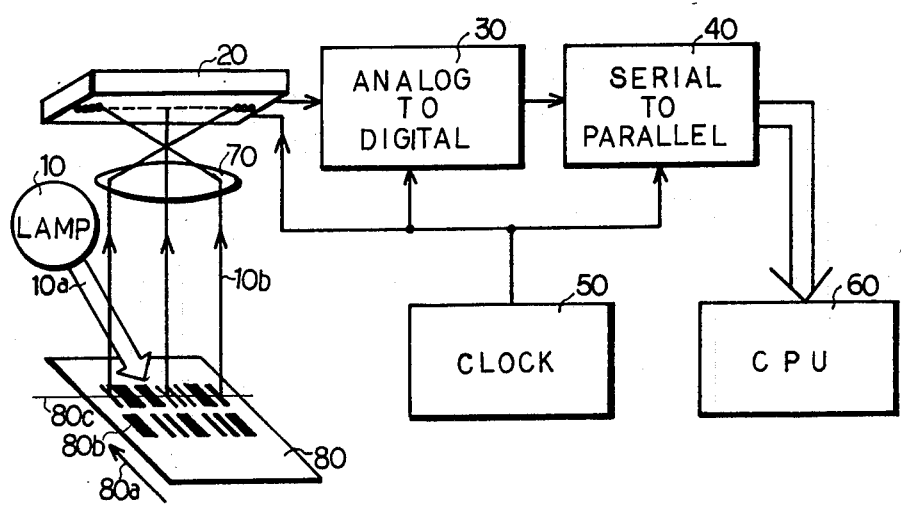
FIG. 1 is a schematic diagram illustrating an embodiment according to the present invention.

Referring first to FIG. 1, a light source 10 such as a reflector lamp is employed to uniformly supply illumination light 10a over an information card 80 on which bar code information is recorded. An image sensor 20 having a plurality of photo diodes aligned on a straight scanning line receives reflected light 10b produced from the card 80. Each photo diode of the image sensor 20 is swept in sequence upon receipt of a clock pulse from a clock circuit 50 and generates in turn an image signal, the signal level of which corresponds to the density of the reflected light 10b. A lens 70 is optically coupled with the image sensor 20 for light converging purpose. The image sensor 20 is connected to an analog-to-digital (A-D) circuit 30 which converts the image signal into a serial rectangular signal in response to the clock pulse. The A-D circuit 30 is connected to a serial-to-parallel (S-P) circuit 40 which converts the serial rectangular signal into a parallel digital signal in response to the clock pulse. The S-P circuit 40 is connected to a central processing unit (CPU) 60 which recognizes the bar code information scanned by the image sensor 20 and represented by the parallel digital signal. The card 80 is moved either manually or automatically in a predetermined direction 80a which is parallel to the longitudinal direction of the bar symbol 80b and orthogonal to the scanning direction 80c of the image sensor 20. The CPU 60 may be connected to a utilization device such as a display device for displaying the information recognized.

Figure 2:
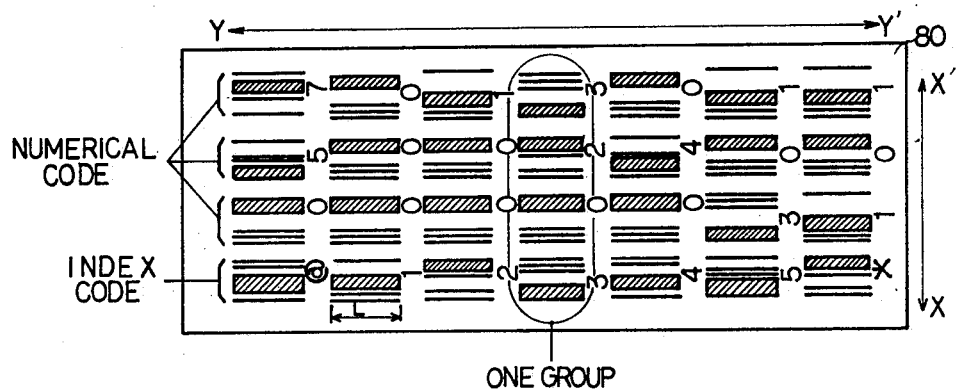
FIG. 2 is an enlarged top plan view of the information card illustrated in FIG. 1.

Bar code information on the card 80 is shown in detail in FIG. 2 and each bar code is shown in FIG. 4. As shown in FIG. 2, the bar code information includes seven group bar codes aligned in Y-Y' direction. Each group bar code includes four bar codes aligned in X-X' direction. As shown in FIG. 4, each bar code representing numerical information 0 through 9 consists of two wide bar symbols and five narrow bar symbols determined by four black bar symbols and three white bar symbols therebetween. Thus the bar code is derived from well-known "2 OUT OF 7 COMBINATIONS" in which two bar symbols, one in black and the other in white, among a total of seven bar symbols are used. The bar widths N and W of the respective narrow and wide bar symbols are determined to satisfy the relationship $W=2.5N$ therebetween, whereas the bar length L of the bar symbols are uniformly determined to be constant. A white space having the wide width W is alloted between two bar codes. Some of bar codes representing numerical information 1 through 5 and positioned at the lowest position in FIG. 2 are used as index codes, whereas other bar codes representing numerical information 1 through 9 and positioned except at the lowest position in FIG. 2 are used as numerical codes by which information to be recognized is carried. The first and the last group bar codes include respective specific index codes @ and * excluded from "2 OUT OF 7 COMBINATIONS" and having three wide bar symbols so that it may be discriminated with ease whether the card 80 is moved in the predetermined direction or in the opposite direction. It should be noted that each group bar code is recorded centrally on the card 80, thus leaving record phrohibition spaces in white on both sides.

According to the system arrangement shown in FIG. 1 and the code arrangement shown in FIG. 2, the bar code information is scanned and converted into the electric signal in the following manner. While the information card 80 is moved in the direction 80a, the illumination light 10a supplied from the light source 10 is reflected by the bar symbols 80b. Since the bar symbols 80b in each group are recorded in white and in black alternately, the density of reflected light 10b is corresponding to the color of the bar symbol 80b and the width of reflected light 10b is proportional to the width of the bar symbol 80b. The image sensor 20, driven by the clock pulse of a fixed frequency, scans the density of reflected light 10b in the transverse direction 80c and serially produces the image signal having the output level indicative of the scanned density of reflected light 10b. The A-D circuit 30, receiving the clock pulse, compares the output level of the image signal with a reference level predetermined to discriminate whether the scanned density of reflected light 10b corresponds to the black bar or white bar and serially produces the rectangular signal. The rectangular signal, as a result, has the output level indicative of the color of bar symbols 80b and the time width proportional to the width of bar symbols 80b. It should be noted herein that plural times of code scanning is automatically attained for the same bar code during the movement of the card 80 and that the time width of rectangular signal is not affected by the change of moving speed of the card 80.

Figure 3:
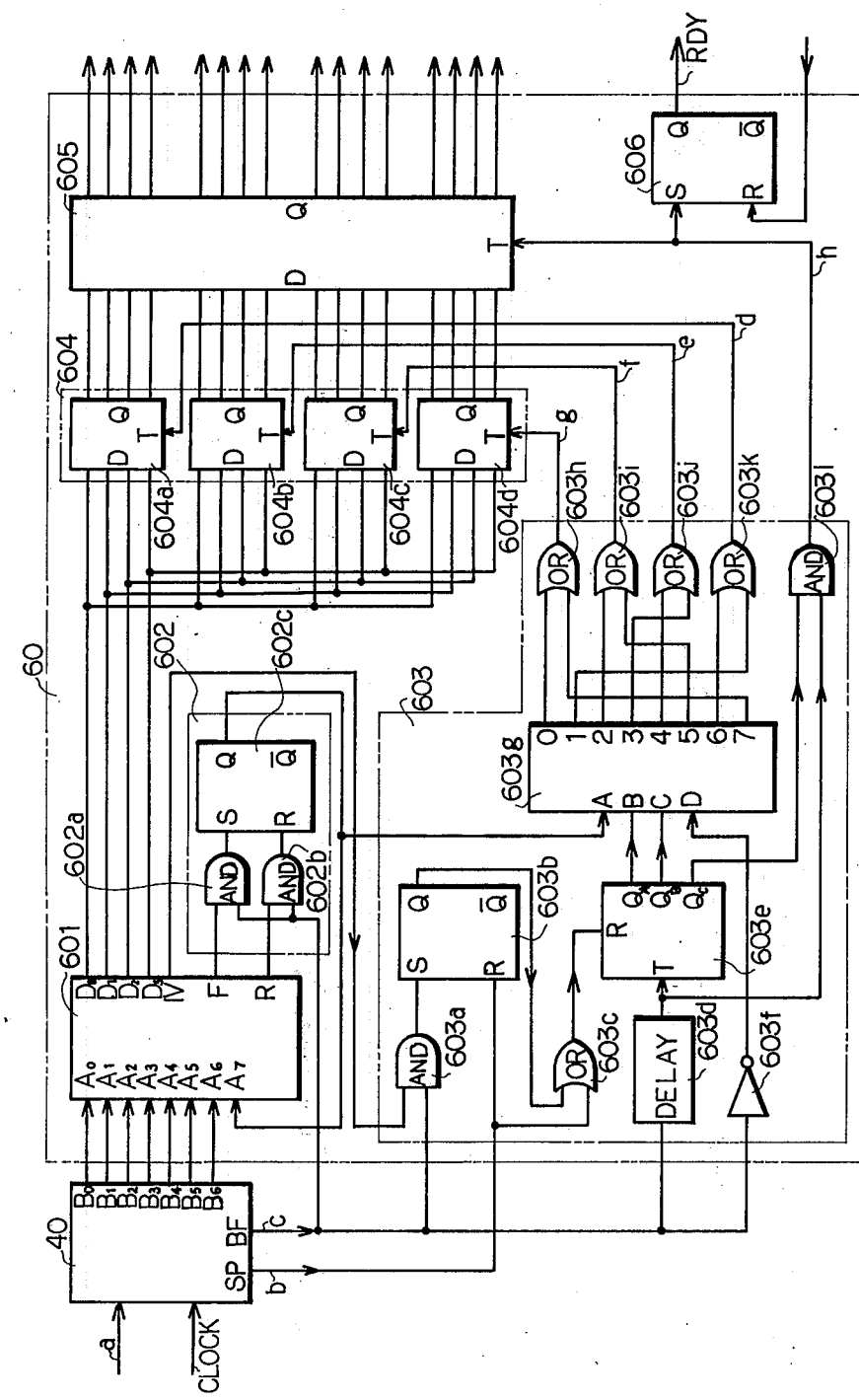
FIG. 3 is an electric wiring diagram illustrating mainly the details of the CPU 60 shown in FIG. 1.

To describe the S-P circuit 40 and the CPU 60 in detail, reference is made to FIG. 3.

S-P circuit 40 is shown in a simple block since it is fully disclosed in the prior application identified hereinabove as a related patent application. It should be noted herein that the S-P circuit 40 is adapted to produce parallel digital signal at nine output terminals SP, BF and $B_6$ through $B_0$. The S-P circuit 40, comparing the time width of rectangular signal a applied from the A-D circuit 30 with a reference time width indicative of the predetermined width of record prohibition space of the card 80, produces a "1" level signal b at the terminal SP when the time width of rectangular signal exceeds the reference time width. The S-P circuit 40, comparing each time width rectangulr signal a with another reference time width predetermined intermediately between the wide bar width W and the narrow bar width N, produces 7-bit parallel digital signal at the output terminals $B_6$ through $B_0$. Each bit of the 7-bit digital signal represents each width of seven bar symbols which constitute one bar code. The wide bar symbol and the narrow bar symbol are represented by a "1" signal and a "0" signal, respectively, for example. The S-P circuit 40 further produces a "1" output signal c at the terminal BF when one bar code having seven bar symbols is scanned and represented at the terminals $B_6$ through $B_0$. The relationship between the twelve kinds of bar codes and the corresponding 7-bit digital signals is shown in FIG. 4. Provided that the index bar code @ is scanned the output data ($B_6 B_5 B_4 B_3 B_2 B_1 B_0$) of the S-P circuit 40 becomes binary output data (0 0 1 1 0 1 0) and (0 1 0 1 1 0 0) due to forward scanning and reverse scanning, respectively. It is a matter of course that the 7-bit output data for each bar code is reversely arranged, when the bar code is scanned in the reverse direction. It should be noted herein that the forward 7-bit digital signal of one numerical code becomes equal to the reverse 7-bit digital signal of the other numerical code. The forward 7-bit digital signals of numerical codes 0, 1, 2, 3, 4, 5, 6, 7, 8 and 9 become equal to the reverse 7-bit digital signals of numerical codes 3, 8, 9, 0, 7, 6, 5, 4, 1 and 2, respectively. The 7-bit digital signal of the index code @ and *, however, does not become equal to any one of 7-bit digital signals.

Referring back to FIG. 3, the CPU 60 is shown to include a read-only-memory (ROM) 601, a discrimination circuit 602, a data arrangement control circuit 603, a distribution circuit 604, a buffer register 605 and an R-S flip-flop 606. The ROM 601 is connected to receive 7-bit output data ($_6 B_5 B_4 B_3 B_2 B_1 B_0$) of the S-P circuit 40 at input terminals $A_6$ through $A_0$ and an output signal of the discrimination circuit 602 at an input terminal $A_7$. The ROM 601 converts the input data ($A_6$------$A_0$) into a binary coded decimal (BCD) output data ($D_3$------$D_0$) according to a predetermined conversion program. The ROM 601 further produces an output IV indicative of invalidity of the input data ($A_6$-----$A_0$), an output F indicative of forward scanning direction and an output R indicative of reverse scanning direction. The data conversion program of the ROM 601 is shown in a TABLE attached hereto. The discrimination circuit 602 is constituted by AND gates 602a and 602b and an R-S flip-flop 602c to discriminate whether the scanning direction is forward or reverse in response to the output data F and R of the ROM 601 and the output datum BF of the S-P circuit 40. The data arrangement control circuit 603 is constituted by AND gates 603a and 6031, an R-S flip-flop 603b, OR gates 603c and 603h through 603k, a delay 603d, a binary counter 603e, an inverter 603f and a selector 603g to control the distribution circuit 604 in response to output datum IV of the ROM 601, output signal of the discrimination circuit 602 and output data SP and BF of the S-P circuit 40. The distribution circuit 604 is constituted by four buffer registers 604a through 604d which are connected to receive BCD output data ($D_3$----$D_O$) of the ROM 601. The buffer registers 604a through 604d are so connected to the data arrangement control circuit 603 that they are sequentially triggered to memorize the BCD output data ($D_3 D_2 D_1 D_0$) of the ROM 601.

Operation of the CPU 60 is described hereinunder with reference to FIGS. 5A and 5B. FIG. 5A shows signal waveforms (a) through (h) appearing at respective points a through h of the CPU 60 in case of forward scanning and FIG. 5B shows signal waveforms (a) through (h) in case of reverse scanning.

It is assumed first that the card 80 is moved so that bar code information is scanned from the group having the index code @ to the group having the index code *. On this occasion, each scanning is attained in the forward direction, from X to X' in FIG. 2. When the record prohibition space beside the index code @ is scanned, the rectangular signal a shown in (a) of FIG. 5A is kept long enough at "1" level indicative of white space and the S-P circuit 40 produces the "1" level signal b as shown in (b) of FIG. 5A at a time $t_1$. This "1" level signal b is applied to the R-S flip-flop 603b and the OR gate 603c to which the binary counter 603e is connected. Both R-S flip-flop 603b and the binary counter 603e are reset simultaneously at the time $t_1$. After the time $t_1$, seven bar symbols of the index code @ are scanned sequentially and the S-P circuit 40 sequentially converts the rectangular signal a corresponding to the index code @ into the 7-bit digital signal. When the conversion is completed at a time $t_2$, the S-P circuit 40 produces not only the 7-bit output data ($B_6 B_5 B_4 B_3 B_2 B_1 B_0$ = 0 0 1 1 0 1 0) indicative of the index code at but also the "1" level signal c as the BF output datum. Since the scanning direction is forward in this case, the "1" level signal is applied to the input terminal $A_7$ of the ROM 601. Receiving 8-bit input data ($A_7 A_6 A_5 A_4 A_3 A_2 A_1 A_0$ = 1 0 0 1 1 0 1 0), the ROM 601 converts this binary input data into the BCD output data ($D_3 D_2 D_1 D_0$ = 1 0 1 0) in accordance with the conversion program shown in the TABLE. Other output data F, R and IV of the ROM 601, on this occasion, become "1", "0" and "0" signals, respectively. It is indicated by the output datum IV = 0 that the BCD output data ($D_3 D_2 D_1 D_0$ = 1 0 1 0) is valid. Receiving two "1" signals produced at the BF and F terminals of the respective S-P circuit 40 and the ROM 601, the AND gate 602a applies a "1" output signal to the terminal S of the R-S flip-flop 602c. Since the R-S flip-flop 602c has been set to produce the "1" signal already, it keeps applying the "1" signal from the output terminal Q thereof to the input terminal $A_7$ of the ROM 601. On the other hand, the R-S flip-flop 603b keeps reset condition to produce a "0" signal at the output terminal Q thereof, since the "0" signal produced at the output terminal IV of the ROM 601 is applied to the AND gate 603a which responsively cut off the "1" signal c of the S-P circuit 40. The "1" signal c is further applied to the inverter 603f which in turn produces a "" signal. The selector 603g receives the "0" signal produced by the inverter 603f, a "0" signal produced at the output terminal $Q_B$ of the binary counter 603e, a "0" signal produced at the output terminal $Q_A$ of the binary counter 603e and the "1" signal produced by the discrimination circuit 602 at respective input terminals D, C, B and A and converts this binary input data (DCBA = 0 0 0 1) into a decimal output data 1. As a result, a "1" signal is produced only at the output terminal 1 of the selector 603g. This 37 1" signal is applied to the OR gate 603k which in turn produces a strobe pulse d shown in (d) of FIG. 5A. The buffer register 604a in the data distribution circuit 604 memorizes the input data (1 0 1 0) indicative of the index code @ in synchronism with the strobe pulse d. It should be noted from the foregoing description that the input data (1 0 1 0) is produced by the ROM 601 at the time $t_2$ to represent the index bar code @. The "1" signal c produced by the S-P circuit 40 is further applied to the delay 603d to be delayed thereby and the binary counter 603e produces a "1" signal at the output terminal $Q_A$ thereof after the time $t_2$.

When the next bar code 0 in the first group is completed to be scanned, the S-P circuit 40 produces another "1" signal c at the terminal BF as shown in (c) of FIG. 5A and the 7-bit output data ($B_6 B_5 B_4 B_3 B_2 B_1 B_0$ = 0 0 0 0 0 1 1) which is applied to the input terminals $A_6$ through $A_0$ of the ROM 601 at a time $t_3$. Since the ROM 601 receives the "1" signal indicative of forward scanning at the terminal $A_7$, the BCD output data ($D_3 D_2 D_1 D_0$ = 0 0 0 0) and other output data (F=0, R=0 and IV=0) are produced according to conversion program shown in the TABLE. The R-S flip-flop 602c of the discrimination circuit 602, as a result, is kept in its set condition to produce the "1" signal. The selector 603g receives the input data (DCBA = 0 0 1 1) and produces a "1" signal only at the output terminal 3. This "1" signal is passed through the OR gate 603j to result in another strobe pulse e shown in (e) of FIG. 5A. The buffer register 604b of the data distribution circuit 604 memorizes the BCD output data ($D_3 D_2 D_1 D_0$ = 0 0 0 0) indicative of the bar code o in response to the strobe pulse e. The binary counter 603e produces a "1" signal at the output terminal $Q_B$ after the time $t_3$.

In the quite same manner as described hereinabove, the bar code 5 in the first group is completed to be converted into corresponding BCD output data ($D_3 D_2 D_1 D_0$ = 0 1 0 1) at the time $t_4$ and the last bar code 7 in the first group is completed to be converted into corresponding BCD output data ($D_3 D_2 D_1 D_0$ = 0 1 1 1) at at time $t_5$. Therefore, strobe pulses f and g are produced by respective OR gates 603i and 603g at the corresponding times $t_4$ and $t_5$ as shown in (f) and (g) of FIG. 5A. The buffer registers 604c and 604d, as a result, memorizes the BCD input data (0 1 0 1) indicative of the bar code 5 and (0 1 1 1) indicative of the bar code 7 in response to respective strobe pulses f and g. When all bar codes in the first group are scanned, the AND gate 6031 produces a strobe pulse h shown in (h) of FIG. 5A after the time $t_5$ and the buffer register 605 synchronously memorizes 16-bit output data of the distribution circuit 604. The R-S flip-flop 606 is set by the strobe pulse h to produce a "1" level signal RDY indicative of the completion of scanning the group bar code having the index code @.

It is assumed next that the card 80 is moved so that the bar code information is scanned from the group having the index code * to the group having the index code @. On this occasion, each scanning is attained in the reverse direction, from X' to X. After the groups having respective index code *, 5, 4, 3, 2 and 1 have been scanned plural times, the group having the index code @ is scanned in the reverse direction, X' to X. Since image sensor 20 scans the record prohibition space in white, bar code 7, 5 and 0 and the index bar code @ in this order, the S-P circuit 40 receives the rectangular signal a shown in (a) of FIG. 5B. At a time $t_1'$ when the record prohibition space beside the bar code 7 is completed to be scanned, the S-P circuit 40 produces the "1" signal b at the terminal SP as shown in (b) of FIG. 5B and the R-S flip-flop 603b and the binary counter 603e are reset. When the rectangular signal a corresponding to the bar code 7 is converted into the parallel digital signal ($B_6 B_5 B_4 B_3 B_2 B_1 B_0$ = 0 0 1 0 0 1 0) at a time $t_2'$, the "1" signal c is produced at the terminal BF of the S-P circuit 40 are shown in (c) of FIG. 5B. Receiving the input data ($A_7$ = 0 and $A_6 A_5 A_4 A_3 A_2 A_1 A_0$ = 0 0 1 0 0 1 0) indicative of the reverse scanning direction and the bar code 7, respectively, the ROM 601 produces the output data (F=0, R=0, IV=0 and $D_3 D_2 D_1 D_0$ = 0 1 1 1) according to the conversion program shown in the TABLE. The selector 603g receives the input data (DCBA = 0 0 0 0) at the time $t_2'$ and produces a "1" signal only at the terminal 0. This "1" signal is applied to the buffer register 604d through the OR gate 603h as the strobe pulse g shown in (g) of FIG. 5B. As a result, the output data ($D_3 D_2 D_1 D_0$ = 0 1 1 1) is memorized in the buffer register 604d of the distribution circuit 604. In the quite same manner as described with regard to the bar code 7, other bar codes 5, 0 and @ are memorized in the respective buffer registers 604c, 604b and 604a in response to the strobe pulses f, e and d which are produced at respective times $t_3'$, $t_4'$ and $t_5'$ as shown in (f), (e) and (d) of FIG. 5B. After the time $t_5'$ when the index code @ is memorized, the AND gate 6031 produces the strobe pulse h shown in (h) of FIG. 5B and the buffer register 605 memorizes the bar codes @ 057 at once. It should be noticed that, since the buffer registers in the distribution circuit are adapted to be triggered in the reverse order (from the register 604d to the register 604a) when the bar code information is scanned in the reverse direction, each group bar code is always memorized in the predetermined order irrespective of the reversion in scanning directions.

Provided that the "1" signal indicative of the forward scanning direction is kept applied to the input terminal $A_7$ of the ROM 601 when the group having the index code @ is scanned reversely for the first time, the discrimination circuit 602 keeps producing the "1" signal until the index bar code @ is scanned. When the bar codes 7, 5 and 0 are scanned sequentially and converted into respective parallel digital signals ($B_6 B_5 B_4 B_3 B_2 B_1 B_0$ = 0 0 1 0 0 1 0, 0 1 0 0 0 0 1 and 1 1 0 0 0 0 0) by the S-P circuit 40 according to FIG. 4, the ROM 601 produces the BCD output data ($D_3 D_2 D_1 D_0$ = 0 1 0 0, 0 1 1 0 and 0 1 1 0) according to the conversion program shown in the TABLE. These output data ($D_3 D_2 D_1 D_0$ = 0 1 0 0, 0 1 1 0 and 0 1 1 0) correspond to the bar codes 4, 6 and 3, respectively. When the index code @ is scanned, the ROM 601 receives the input data ($A_7 A_6 A_5 A_4 A_3 A_2 A_1$ = 1 0 1 0 1 1 0 0) and produces the output data (F=0, R=1, IV=1 and $D_3 D_2 D_1 D_0$ = 1 1 1 1) according to the conversion program. The "1" signal appearing at the terminal IV of the ROM 601 sets the R-S flip-flp 603b through the AND gate 603a and the "1" signal produced by the R-S flip-flop 603b resets the binary counter 603e through the OR gate 603c. The AND gate 6031, as a result, does not produce the strobe pulse h and the buffer register 605 is prevented from memorizing the erroneous output data of the ROM 601. The group having the index bar code @, however, is correctly memorized by the buffer register 605 when it is scanned for the second time, since the discrimination circuit 602 produces the "0" signal indicative of the reverse scanning direction in response to the "1" signal produced at the terminal R of the ROM 601.

It is a matter of course in both forward and reverse scannings that, when the bar code is recorded erroneously on the card 80 or when either one of the image sensor 20, the A-D circuit 30 and the S-P circuit 40 does not operate correctly, the ROM 601 produces the "1" signal at the output terminal IV to represent invalidity of the input data ($A_6 A_5 A_4 A_3 A_2 A_1 A_0$). As a result, the AND gate 603a produces the "1" signal in response to the "1" signal c produced by the S-P circuit 40 and the R-S flip-flop 603b is set to produce the "1" signal at the output terminal Q thereof. This "1" signal is applied to the binary counter 603e through the OR gate 603c. The binary counter 603e is therefore reset even during the counting operation and the buffer register 605 is prevented from memorizing the erroneous output data of the ROM 601.

Although the present invention is described with reference to one embodiment, it may be modified as follows. The image sensor 20 adapted to be electrically driven by the clock pulse may be replaced by a laser beam sensor for scanning the bar code information by virtue of the laser beam or a single light responsive element. The numbers of bar codes included in one group may be increased or decreased as desired. The bar code information may be recorded on other objects and the sensor for scanning the bar code information may be moved. The bar code information may be recorded in other forms except "2 OUT OF 7 COMBINATIONS".

TABLE (DATA CONVERSION PROGRAM OF ROM 601)

| INPUT DATA | | | | | | | OUTPUT DATA | | | | | | | CORRESPONDENCE (FORWARD) |
|---|---|---|---|---|---|---|---|---|---|---|---|---|---|---|
| $A_7$ | $A_6$ | $A_5$ | $A_4$ | $A_3$ | $A_2$ | $A_1$ | $A_0$ | F | R | IV | $D_3$ | $D_2$ | $D_1$ | $D_0$ | (REVERSE) |
| 0 | 0 | 0 | 0 | 0 | 0 | 1 | 1 | 0 | 0 | 0 | 0 | 0 | 1 | 1 | 3 (R) |
| 0 | 0 | 0 | 0 | 0 | 1 | 0 | 1 | 0 | 0 | 0 | 1 | 0 | 0 | 0 | 8 (R) |
| 0 | 0 | 0 | 0 | 1 | 0 | 0 | 1 | 0 | 0 | 0 | 1 | 0 | 0 | 1 | 9 (R) |
| 0 | 0 | 0 | 0 | 1 | 0 | 1 | 1 | 1 | 0 | 1 | 1 | 1 | 1 | 1 | * (F) |
| 0 | 0 | 0 | 1 | 0 | 0 | 1 | 0 | 0 | 0 | 0 | 0 | 1 | 1 | 1 | 7 (R) |
| 0 | 0 | 0 | 1 | 1 | 0 | 1 | 0 | 1 | 0 | 1 | 1 | 1 | 1 | 1 | at (F) |
| 0 | 0 | 1 | 0 | 0 | 0 | 0 | 1 | 0 | 0 | 0 | 0 | 1 | 0 | 1 | 5 (R) |
| 0 | 0 | 1 | 0 | 0 | 1 | 0 | 0 | 0 | 0 | 0 | 0 | 1 | 0 | 0 | 4 (R) |
| 0 | 0 | 1 | 0 | 1 | 1 | 0 | 0 | 0 | 1 | 0 | 1 | 0 | 1 | 0 | at (R) |
| 0 | 0 | 1 | 1 | 0 | 0 | 0 | 0 | 0 | 0 | 0 | 0 | 0 | 0 | 1 | 1 (R) |
| 0 | 1 | 0 | 0 | 0 | 0 | 1 | 0 | 0 | 0 | 0 | 0 | 1 | 1 | 0 | 6 (R) |
| 0 | 1 | 0 | 0 | 1 | 0 | 0 | 0 | 0 | 0 | 0 | 0 | 0 | 1 | 0 | 2 (R) |
| 0 | 1 | 1 | 0 | 0 | 0 | 0 | 0 | 0 | 0 | 0 | 0 | 0 | 0 | 0 | 0 (R) |
| 0 | 1 | 1 | 0 | 1 | 0 | 0 | 0 | 0 | 1 | 0 | 1 | 0 | 1 | 1 | * (R) |
| 1 | 0 | 0 | 0 | 0 | 1 | 1 | 0 | 0 | 0 | 0 | 0 | 0 | 0 | 0 | 0 (F) |
| 1 | 0 | 0 | 0 | 0 | 1 | 1 | 0 | 0 | 0 | 0 | 0 | 0 | 0 | 1 | 1 (F) |
| 1 | 0 | 0 | 0 | 1 | 0 | 0 | 1 | 0 | 0 | 0 | 0 | 0 | 1 | 0 | 2 (F) |
| 1 | 0 | 0 | 0 | 1 | 0 | 1 | 1 | 1 | 0 | 1 | 1 | 1 | 0 | 1 | * (F) |
| 1 | 0 | 0 | 1 | 0 | 0 | 1 | 0 | 0 | 0 | 0 | 0 | 1 | 0 | 0 | 4 (F) |
| 1 | 0 | 0 | 1 | 1 | 0 | 1 | 0 | 1 | 0 | 0 | 1 | 0 | 1 | 0 | at (F) |
| 1 | 0 | 1 | 0 | 0 | 0 | 0 | 1 | 0 | 0 | 0 | 0 | 1 | 1 | 0 | 6 (F) |
| 1 | 0 | 1 | 0 | 0 | 1 | 0 | 0 | 0 | 0 | 0 | 1 | 1 | 1 | 1 | 7 (F) |
| 1 | 0 | 1 | 0 | 1 | 1 | 0 | 0 | 0 | 1 | 1 | 1 | 1 | 1 | 1 | at (R) |
| 1 | 0 | 1 | 1 | 0 | 0 | 0 | 0 | 0 | 0 | 1 | 0 | 0 | 0 | 0 | 8 (F) |
| 1 | 1 | 0 | 0 | 0 | 1 | 0 | 0 | 0 | 0 | 0 | 0 | 1 | 0 | 1 | 5 (F) |
| 1 | 1 | 0 | 0 | 1 | 0 | 0 | 0 | 0 | 0 | 0 | 1 | 0 | 0 | 1 | 9 (F) |
| 1 | 1 | 0 | 1 | 0 | 0 | 0 | 0 | 0 | 0 | 0 | 0 | 0 | 1 | 1 | 3 (F) |
| 1 | 1 | 1 | 0 | 1 | 0 | 0 | 0 | 0 | 1 | 1 | 1 | 1 | 1 | 1 | * (R) |
| OTHER DATA | | | | | | | | 0 | 0 | 1 | 1 | 1 | 1 | 1 | NONE |

What we claim is:

1. A system for recognizing bar code information comprising:

an object carrying the information constituted by a plurality of bar codes each of which has four black bars and three white bars, one of said bar codes being arranged at either the head or the tail of said information and constituted as an index code in a different manner from the other of said bar codes constituted as numerical codes in such a manner that one of said four black bars and one of said three white bars have wide widths and the other of said four black bars and the other of said three white bars have narrow widths;

scanning means adapted to scan said bar codes at a constant speed in a direction transverse to said bars for serially producing an output signal having output levels indicative of the colors of said bars and time widths proportional to the widths of said bars;

converting means connected to sequentially convert said output signal produced while one of said bar codes is scanned into a code signal indicative of corresponding one of said bar codes;

a plurality of memory means connected to be triggered to memorize said code signal;

discriminating means for discriminating, in response to said output signal corresponding to said index code, whether the scanning direction of said scanning means is forward or reverse; and sequence control means connected to trigger said memory means one by one at every completion of converting operation of said converting means and to reverse the sequence according to which said memory means are triggered when the discrimination result of said discriminating means is reversed, whereby each of said bar codes is memorized by corresponding one of said memory means irrespective of the reversion of the scanning direction of said scanning means.

2. A system according to claim 1, wherein said scanning means includes an image sensor having a plurality of light responsive elements aligned transversely to said bars and triggered one by one by a clock pulse of a fixed frequency.

3. A system according to claim 2, wherein said converting means includes:

a serial-to-parallel conversion circuit for converting said output signal corresponding to said one of said bar codes into a plural bits of parallel signal bit levels of which represent the widths of corresponding bars of said one of said bar codes; and a read-only-memory connected to receive said plural bits of parallel signal and the output signal indicative of the discrimination result of said discrimination means for producing said code signal and other signals in parallel according to a conversion program preset therein, said other signals including a signal indicative of the invalidity of said code signal, a signal indicative of the forward scanning of said scanning means and a signal indicative of the reverse scanning.

4. In combination with bar code information constituted by a plurality of bar codes each of which has a predetermined number of bar symbols arranged in parallel with each other in different widths, one of said bar codes being arranged at either the head or the tail of said bar codes and constituted as an index code in a different bar arranging method from the other of said bar codes constituted in a predetermined bar arranging method, an information recognition system comprising:

a scanner adapted to scan said bar codes one by one at a constant speed in a direction transverse to said bar symbols for serially producing a rectangular signal having time widths proportional to the widths of said bar symbols;

a serial-to-parallel conversion circuit connected to convert said rectangular signal into a first parallel code signal indicative of corresponding one of bar codes and to produce another output pulse indicative of the completion of converting operation thereof;

a program memory connected to receive said first parallel code signal and another signal and to produce a second parallel code signal and other signals according to an input-output conversion program thereof, said conversion program being determined such that said second parallel code signal represents said corresponding one of bar codes irrespective of scanning directions of said scanner and that said other signals represent the forward and reverse scanning directions of said scanner when said first parallel code signal correspond to respective forward and reverse scannings of said index code;

a discrimination circuit connected to receive said other signals of said program memory for producing said another signal which is applied to said program memory and indicative of scanning directions of said scanner;

a plurality of buffer registers connected to be triggered to memorize said second parallel code signal; and a sequence control circuit connected to trigger said buffer registers one by one in response to said another output pulse of said serial-to-parallel conversion circuit, said control circuit reversing triggering sequences for said buffer registers in response to the reversion of said another signal of said discrimination circuit, whereby each of said bar codes is memorized by corresponding one of said buffer registers irrespective of the scanning directions of said scanner.

* * * * *